United States Patent
Orihara et al.

(10) Patent No.: US 10,936,934 B2
(45) Date of Patent: *Mar. 2, 2021

(54) ANTENNA DEVICE AND ELECTRONIC APPARATUS

(71) Applicant: DEXERIALS CORPORATION, Tokyo (JP)

(72) Inventors: Katsuhisa Orihara, Tochigi (JP); Norio Saito, Tochigi (JP); Masahiro Kobo, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,919

(22) PCT Filed: Jun. 28, 2016

(86) PCT No.: PCT/JP2016/069103
§ 371 (c)(1),
(2) Date: Jan. 18, 2018

(87) PCT Pub. No.: WO2017/014010
PCT Pub. Date: Jan. 26, 2017

(65) Prior Publication Data
US 2018/0211150 A1    Jul. 26, 2018

(30) Foreign Application Priority Data

Jul. 22, 2015 (JP) .............................. JP2015-144701

(51) Int. Cl.
*H01Q 7/00* (2006.01)
*G06K 19/077* (2006.01)
(Continued)

(52) U.S. Cl.
CPC ..... *G06K 19/07783* (2013.01); *G06K 19/077* (2013.01); *H01Q 1/02* (2013.01);
(Continued)

(58) Field of Classification Search
CPC .......... H01Q 1/243; H01Q 7/00; H01Q 7/005; H01Q 7/02; H01Q 7/04; H01Q 7/06; H01Q 7/08
See application file for complete search history.

(56) References Cited

U.S. PATENT DOCUMENTS

| 2005/0006482 A1 | 1/2005 | Kano et al. |
| 2006/0000918 A1 | 1/2006 | Kano et al. |

(Continued)

FOREIGN PATENT DOCUMENTS

| CN | 104638342 A | 5/2015 |
| JP | 2003-159753 A | 6/2003 |

(Continued)

OTHER PUBLICATIONS

Aug. 9, 2016 Search Report issued in International Patent Application No. PCT/JP2016/069103.
(Continued)

*Primary Examiner* — Daniel Munoz
(74) *Attorney, Agent, or Firm* — Oliff PLC

(57) ABSTRACT

An antenna device, incorporated in an electronic apparatus, which communicates with an external device via an electromagnetic field signal, comprising: an antenna coil provided by winding a conducting wire in a two-dimensional shape and inductively coupled to the external device; and a thermal diffusion sheet provided so as to overlap the antenna coil at a surface of the antenna coil that faces the external device, wherein the thermal diffusion sheet is provided with a slit formed so as to extend from a region overlapping an opening of the antenna coil to an end of the thermal diffusion
(Continued)

US 10,936,934 B2

Page 2 sheet and a thermal diffusion sheet side opening or slit connected to the slit and formed in the region overlapping the opening of the antenna coil.

14 Claims, 10 Drawing Sheets

(51) Int. Cl.
  *H01Q 1/22* (2006.01)
  *H01Q 1/02* (2006.01)
  *H01Q 1/24* (2006.01)
(52) U.S. Cl.
  CPC ......... *H01Q 1/2216* (2013.01); *H01Q 1/2225* (2013.01); *H01Q 7/00* (2013.01); *H01Q 1/243* (2013.01)

(56) References Cited

U.S. PATENT DOCUMENTS

| | | | |
|---|---|---|---|
| 2010/0052992 A1 | 3/2010 | Okamura et al. | |
| 2011/0050164 A1* | 3/2011 | Partovi | H01F 5/003 320/108 |
| 2013/0307746 A1* | 11/2013 | Nakano | H01Q 1/2225 343/850 |
| 2014/0091758 A1* | 4/2014 | Hidaka | H01F 38/14 320/108 |
| 2015/0076922 A1* | 3/2015 | Kato | H04W 4/80 307/104 |
| 2015/0256228 A1 | 9/2015 | Goma et al. | |
| 2016/0315373 A1* | 10/2016 | Azad | H01Q 1/243 |

FOREIGN PATENT DOCUMENTS

| | | |
|---|---|---|
| JP | 2008-131115 A | 6/2008 |
| JP | 2010-245776 A | 10/2010 |
| JP | 2010-252402 A | 11/2010 |
| JP | 2011-229133 A | 11/2011 |
| JP | 2012-217133 A | 11/2012 |
| JP | 2014-206891 A | 10/2014 |
| WO | 2014/112150 A1 | 7/2014 |

OTHER PUBLICATIONS

May 24, 2019 Office Action issued in Chinese Patent Application No. 201680040627.7.
Oct. 21, 2019 Offie Action issued in Chinese Patent Application No. 201680040627.7.
Jan. 22, 2020 Office Action issued in Chinese Patent Application No. 201680040627.7.
May 25, 2020 Office Action issued in Chinese Patent Application No. 201680040627.7.

* cited by examiner

ANTENNA DEVICE AND ELECTRONIC APPARATUS

BACKGROUND OF THE INVENTION

Field of the Invention

The present invention relates to an antenna device, incorporated in an electronic apparatus, which communicates with an external device such as a transmitter via an electromagnetic field signal and to an electronic apparatus including such an antenna device. The present application claims priority based on Japanese Patent Application No. 2015-144701 filed in Japan on Jul. 22, 2015. The total contents of the patent application are to be incorporated by reference into the present application.

Electronic apparatuses such as mobile phones use antenna modules for RFID (radio frequency identification) in order to have short-distance non-contact communications capabilities. Such an antenna module communicates with an antenna coil of a transmitter such as a reader-writer by means of inductive coupling. That is, such an antenna module allows a magnetic field from the reader-writer to be received by the antenna coil to be converted into electric power to drive an IC that functions as a communication processing unit.

In order to surely perform communication, the antenna module needs to receive magnetic flux of a certain or higher value from the reader-writer with the antenna coil. For that purpose, in an antenna module according to a conventional example is configured such that a housing of a mobile phone or the like is provided with a loop coil with which to receive magnetic flux from a reader-writer. An antenna module incorporated in an electronic apparatus such as a mobile phone may cause magnetic flux from a reader-writer to be rebounded due to an eddy current generated by reception of the magnetic field from the reader-writer by a metal of a substrate, a battery pack, or the like inside the device. For example, in the case of a housing surface of a mobile phone, a magnetic field coming from a reader-writer tends to be strong in the outer regions of the housing surface and weak near the middle of the housing surface.

In the case of an antenna that uses a common loop coil, the loop coil has its opening located in a central part of a mobile phone where it is less likely to receive a magnetic field passing through the outer regions of the aforementioned housing surface. For this reason, the antenna that uses a common loop coil is inefficient in receiving a magnetic field. Given this situation, a method for enhancing communication characteristics by means of a metallic plate of a substrate or the like and an antenna device whose performance is enhanced by increasing magnetic flux with a magnetic sheet have been proposed in the field of RFID antenna modules that are contained in electronic apparatuses (see, for example, Patent Literatures 1 to 4).

Patent Literature 1: JP 2010-245776 A
Patent Literature 2: JP 2010-252402 A
Patent Literature 3: JP 2011-229133 A
Patent Literature 4: JP 2012-217133 A

SUMMARY OF THE INVENTION

Electronic apparatuses such as so-called smartphones are often packed with such an idea to lower the sensible temperature of users by diffusing local heat that a graphite sheet is joined as a thermal diffusion sheet on the inner surface of an exterior cover. In a case where an NFC (near-field communication) antenna for near-field communication is contained in a mobile device such as a smartphone, providing the NFC antenna underneath a graphite sheet causes a magnetic field to be blocked by the graphite sheet, which is a semiconductor, thus undesirably inhibiting antenna communication performance.

The present invention has been made in view of the foregoing problems, and it is an object of the present invention to provide a novel and improved antenna device and electronic apparatus that make it possible to ensure satisfactory communication performance even in a case where an antenna coil is placed on the underside of a thermal diffusion sheet.

A first aspect of the present invention is directed to an antenna device, incorporated in an electronic apparatus, which communicates with an external device via an electromagnetic field signal, including: an antenna coil provided by winding a conducting wire in a two-dimensional shape and inductively coupled to the external device; and a thermal diffusion sheet provided so as to overlap the antenna coil at a surface of the antenna coil that faces the external device, wherein the thermal diffusion sheet is provided with a slit formed so as to extend from a region overlapping an opening of the antenna coil to an end of the thermal diffusion sheet and a thermal diffusion sheet side opening or slit connected to the slit and formed in the region overlapping the opening of the antenna coil.

According to the first aspect of the present invention, the provision of the thermal diffusion sheet side opening or slit in the region of the thermal diffusion sheet overlapping the opening of the antenna coil allows magnetic flux to pass through the thermal diffusion sheet side opening or slit. This makes it possible to ensure satisfactory NFC antenna communication performance even in a case where the antenna coil is placed on the underside of the thermal diffusion sheet.

At this time, in the first aspect of the present invention, the thermal diffusion sheet side slit connected to the slit may be formed so as to extend along an inner shape of the opening of the antenna coil.

This allows magnetic flux to pass through the thermal diffusion sheet side slit, thus making it possible to ensure satisfactory NFC antenna communication performance even in a case where the antenna coil is placed on the underside of the thermal diffusion sheet.

Further, the first aspect of the present invention may further include, on one surface of the thermal diffusion sheet, a metallic sheet formed with at least parts of the slit and the thermal diffusion sheet side slit bored therethrough.

This inhibits a lowering of the Q value of the antenna coil, thus making it possible to ensure satisfactory NFC antenna communication performance even in a case where the antenna coil is placed on the underside of the thermal diffusion sheet.

Further, in the first aspect of the present invention, the opening of the antenna coil may be rectangular, and the thermal diffusion sheet side slit may be formed so as to extend along three sides of the inner shape of the opening.

This allows magnetic flux to pass through the thermal diffusion sheet side slit, thus making it possible to ensure NFC satisfactory antenna communication performance even in a case where the antenna coil is placed on the underside of the thermal diffusion sheet.

Further, in the first aspect of the present invention, the opening of the antenna coil may be rectangular, and the thermal diffusion sheet side slit may be formed so as to extend along four sides of the inner shape of the opening.

This allows magnetic flux to pass through the thermal diffusion sheet side slit, thus making it possible to ensure satisfactory NFC antenna communication performance even in a case where the antenna coil is placed on the underside of the thermal diffusion sheet.

Further, in the first aspect of the present invention, the thermal diffusion sheet may be formed from graphite.

This allows magnetic flux to pass through the thermal diffusion sheet side slit formed in graphite, thus making it possible to ensure satisfactory NFC antenna communication performance even in a case where the antenna coil is placed on the underside of the thermal diffusion sheet.

Further, a second aspect of the present invention is directed to an electronic apparatus that is able to communicate with an external device via an electromagnetic field signal, including the antenna device according to any of the foregoing.

The second aspect of the present invention makes it possible to ensure satisfactory antenna communication characteristics of the electronic apparatus with respect to the external device while improving the degree of freedom of design of the antenna device.

As described above, the present invention makes it possible to ensure satisfactory NFC antenna communication performance even in a case where an antenna coil is placed on the underside of a thermal diffusion sheet.

DETAILED DESCRIPTION OF THE INVENTION

In the following, preferred embodiments of the present invention are described in detail. It should be noted that the present embodiment to be described below is not intended to unduly limit the contents of the present invention as recited in the claims and not all of the configurations to be described in the present embodiment are essential as means for solving the problems of the present invention.

First Embodiment

Figure 1:
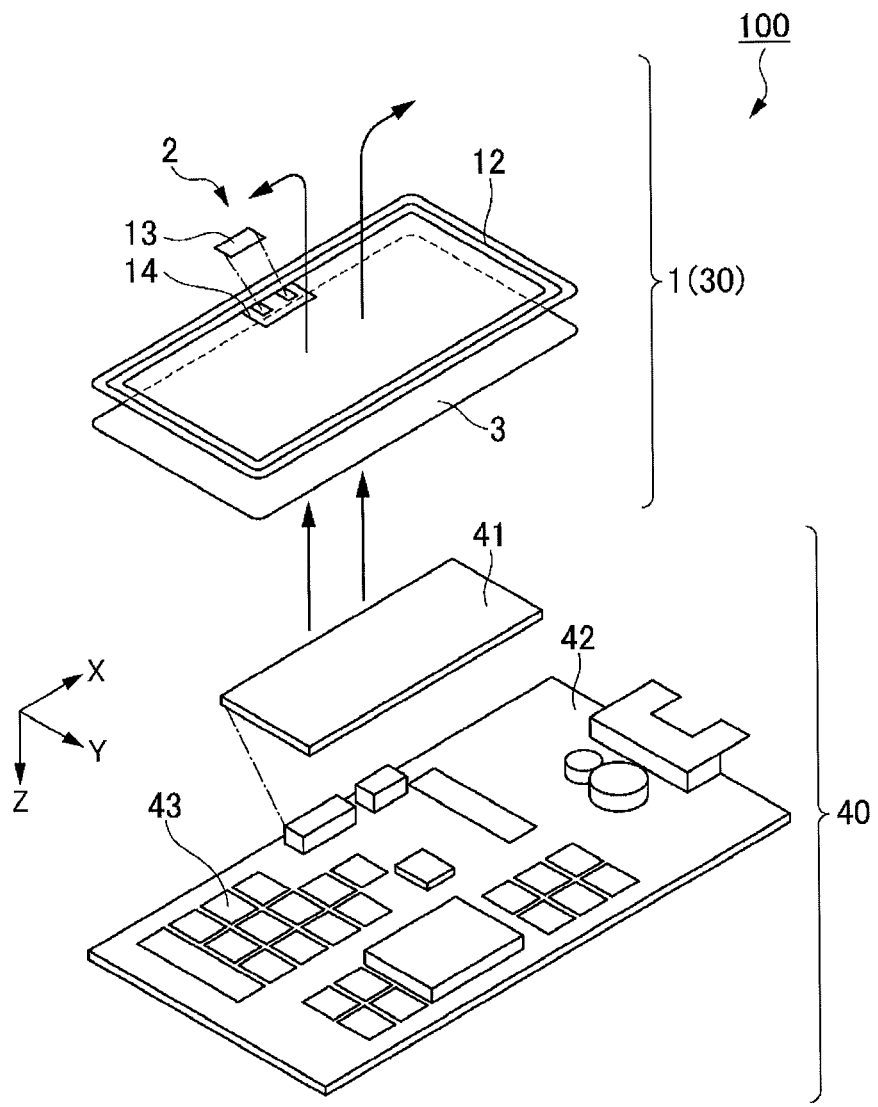
FIG. 1 is a perspective view schematically showing a configuration of a wireless communication system to which an antenna device according to an embodiment of the present invention is applied.
Figure 2A:
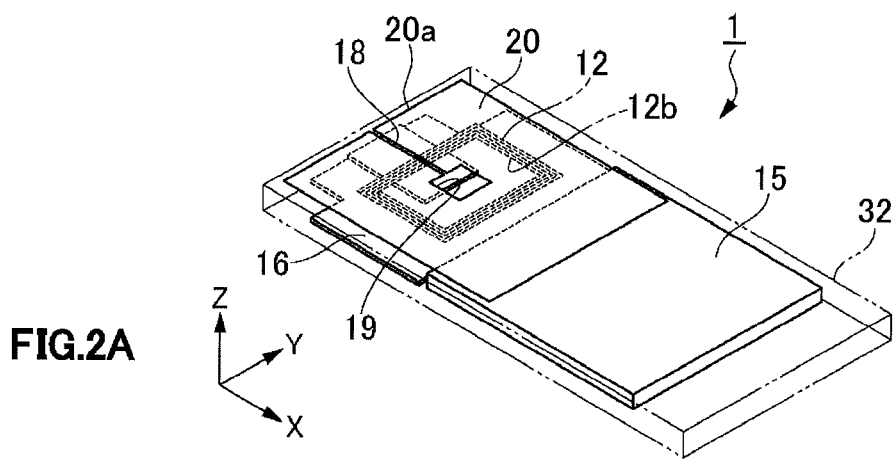
FIG. 2A is a perspective view schematically showing an example of a configuration of an antenna device according to an embodiment of the present invention.
Figure 2B:
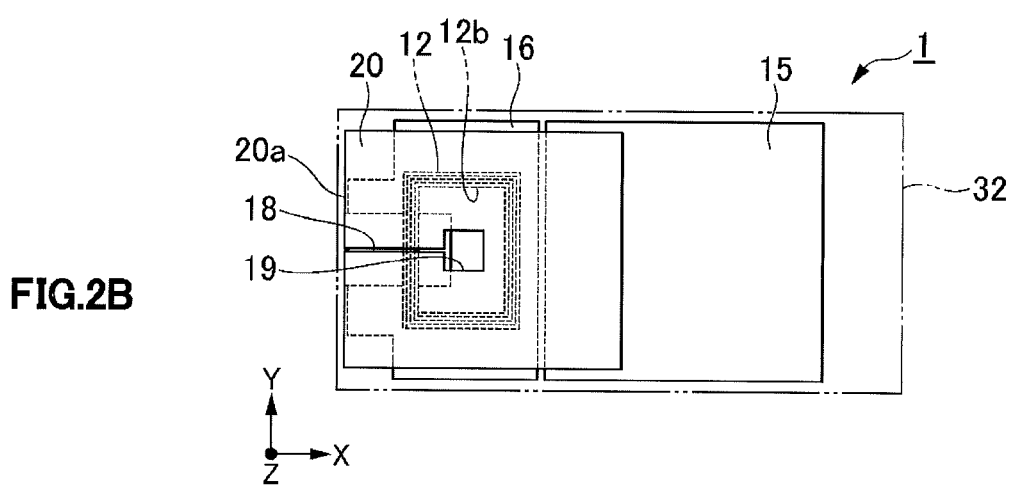
FIG. 2B is a plan view schematically showing an example of a configuration of an antenna device according to an embodiment of the present invention.
Figure 2C:
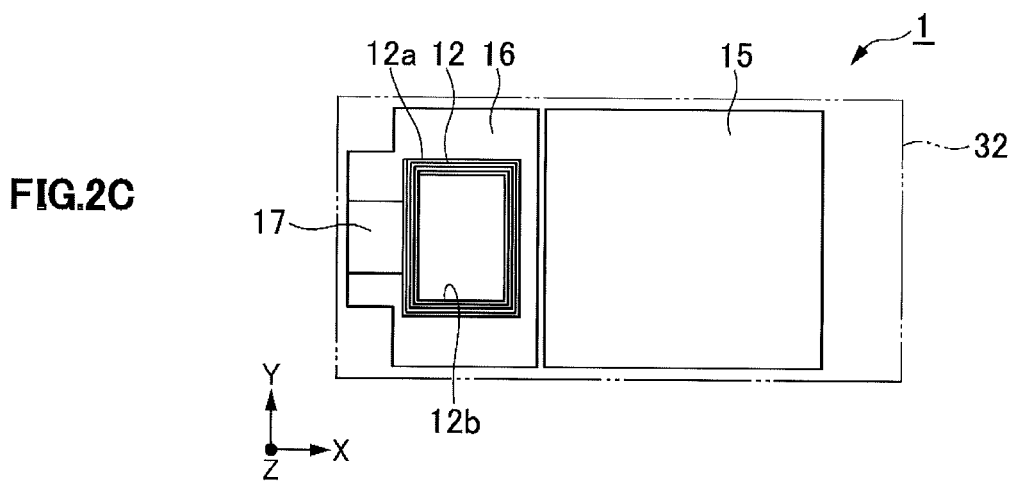
FIG. 2C is a plan view showing the antenna device shown in FIG. 2B from which a thermal diffusion sheet has been removed.

First, a configuration of an antenna device according to an embodiment of the present invention is described with reference to the drawings. FIG. 1 is a perspective view schematically showing a configuration of a wireless communication system to which an antenna device according to an embodiment of the present invention is applied. FIG. 2A is a perspective view schematically showing an example of a configuration of an antenna device according to an embodiment of the present invention. FIG. 2B is a plan view schematically showing an example of a configuration of an antenna device according to an embodiment of the present invention. FIG. 2C is a plan view showing the antenna device shown in FIG. 2B from which a thermal diffusion sheet has been removed.

An antenna device 1 according to the present embodiment is a device, incorporated in an electronic apparatus 30, which communicates with an external device via an electromagnetic field signal. For example, as shown in FIG. 1, the antenna device 1 is incorporated in a wireless communication system 100 for RFID for use.

As shown in FIG. 1, the wireless communication system 100 includes the antenna device 1, which is included in the electronic apparatus 30, and a reader-writer 40 serving as an external device that makes access to the antenna device 1. Assume here that the antenna device 1 and the reader-writer 40 are disposed to face each other at the XY plane of the three-dimensional orthogonal coordinate system XYZ shown in FIG. 1.

The reader-writer 40 functions as a transmitter that transmits a magnetic field in a Z-axis direction toward the antenna device 1, which faces the reader-writer 40 at the XY plane. Specifically, the reader-writer 40 includes an antenna 41 that transmits a magnetic field toward the antenna device 1 and a control board 42 that communicates with the antenna device 1, which is inductively coupled, via the antenna 41.

That is, the reader-writer 40 is provided with the control board 42 electrically connected to the antenna 41. This control board 42 is mounted with a control circuit 43 composed of one or more electronic components such as integrated circuit chips. This control circuit 43 executes various types of process on the basis of data received from the antenna device 1.

For example, in a case where the control circuit 43 transmits data to the antenna device 1, the control circuit 43 codes the data, modulates a carrier wave of a predetermined frequency (e.g. 13.56 MHz) on the basis of the data thus coded, amplifies the modulated signal thus modulated, and drives the antenna 41 with the modulated signal thus amplified. Further, in a case where the control circuit 43 reads out data from the antenna device 1, the control circuit 43 amplifies a modulated signal of data received by the antenna 41, demodulates the modulated signal of data thus amplified, and decodes the data thus demodulated.

It should be noted that the control circuit 43 uses a coding scheme and a modulation scheme that are used by a common reader-writer; for example, the control circuit 43 uses a Manchester coding scheme and an ASK (amplitude shift keying) modulation scheme. Further, the following describes an antenna device and the like in a non-contact communication system but assumes that a non-contact charging system such as Qi can be similarly applied.

As shown in FIG. 2A, the antenna device 1 is, for example, incorporated into a housing 32 of the electronic apparatus 30, such as a mobile phone, which is disposed to face the reader-writer 40 at the XY plane. In the present embodiment, the antenna device 1 includes an antenna module 2, and a communication processing unit 13. The antenna module 2 includes an antenna substrate 3 mounted with an antenna coil 12 that becomes able to communicate with the reader-writer 40, which is inductively coupled. The communication processing unit 13 is driven by an electric current flowing through the antenna coil 12 and communicates with the reader-writer 40.

The antenna device 1 is provided inside the housing 32 (conductor) of the electronic apparatus 30 and communicates with the reader-writer 40, which is inductively coupled. In the present embodiment, as shown in FIGS. 2A to 2C, the antenna device 1 is used in a mobile terminal or the like having the antenna coil 12, a battery pack 15, a printed circuit board 16, and a SIM slot 17.

The antenna substrate 3 is mounted with the antenna coil 12 and a terminal area 14. The antenna coil 12 is formed by a patterning process or the like of a flexible conducting wire 12*a* such as a flexible printed circuit. The terminal area 14 electrically connects the antenna coil 12 and the communication processing unit 13 to each other.

The antenna coil 12 has a function of, upon receipt of a magnetic field that is transmitted from the reader-writer 40, being magnetically coupled to the reader-writer 40 by inductive coupling, receiving a modulated electromagnetic wave, and supplying the received signal to the communication processing unit 13 via the terminal area 14. The antenna coil 12 has a substantially rectangular shape as shown in FIG. 2A, has its single conducting wire 12*a* turned around the edge thereof, and has an opening 12*b* located on a center side thereof. Further, the antenna coil 12 has a principal surface on which the conducting wire 12*a* is turned around, and is disposed so that, at the time of communication, the principal surface faces the reader-writer 40 at the XY plane shown in FIG. 1.

The communication processing unit 13 is driven by an electric current flowing through the antenna coil 12 and communicates with the reader-writer 40. Specifically, the communication processing unit 13 demodulates a received modulated signal, decodes the data thus demodulated, and writes the data thus decoded into an internal memory of the communication processing unit 13. Further, the communication processing unit 13 reads out, from the internal memory, data to be transmitted to the reader-writer 40, codes the data thus read out, modulates the carrier wave on the basis of the data thus coded, and transmits the radio wave thus modulated to the reader-writer 40 via the antenna coil 12, which is magnetically coupled by inductive coupling. It should be noted that the communication processing unit 13 may be driven not by electric power flowing through the antenna coil 12 but by electric power supplied from electricity supply means, such as a battery pack or an external power source, incorporated in the electronic apparatus 30.

A thermal diffusion sheet 20 is provided inside the housing 32 of the electronic apparatus 30 to face the external device 40 in order to allow heat inside the electronic apparatus 30 to be diffused by a part of the housing 32 that faces an electronic component such as the printed circuit board 16 that generates heat while the electronic apparatus 30 is being driven. Specifically, as shown in FIGS. 2A and 2B, the thermal diffusion sheet 20 is provided in a site facing the electronic component (printed circuit board 16), which serves as a heat source, so as to overlap the antenna coil 12 at a surface of the antenna coil 12 that faces the external device 40. Usable examples of the thermal diffusion sheet 20 include a graphite sheet, a carbon fiber sheet, a shield material obtained by etching metal foil of copper or the like into a mesh, and the like. In terms of superiority in functions such as thermal diffusivity, incombustibility, thermal resistance, and ignition prevention, it is preferable that the thermal diffusion sheet 20 be a graphite sheet.

As shown in FIGS. 2A to 2C, the battery pack 15 is provided in the housing 32 of the electronic apparatus 30 (see FIG. 1) and serves as a first conductor that faces the reader-writer 40 (see FIG. 1), which serves as an external device. That is, at the time of communication of the antenna module 2, the battery pack 15 constitutes the first conductor that faces the reader-writer 40.

Since the battery pack 15 allows passage of electricity comparatively well, the application of an alternating magnetic field from an outside source generates an eddy current that undesirably rebounds the magnetic field. An examination of a magnetic field distribution at the time of the application of an alternating magnetic field from an outside source shows such a characteristic that the magnetic field is strong on an end side of the battery pack 15, which serves as the first conductor that faces the reader-writer 40. For this reason, in order to achieve satisfactory communication characteristics with the reader-writer 40 while achieving miniaturization of the electronic apparatus 30 such as a mobile phone at the time of incorporation into the electronic apparatus 30, the provision of the antenna coil 12 of the antenna module 2 at an outer edge side of the battery pack 15 provided inside the housing 32 of the mobile phone 30 has conventionally been carried out.

Further, along with the miniaturization and multi-functionalization of the electronic apparatus 30, the graphite sheet 20 of graphite or the like has come to be often provided for the purpose of diffusing heat generated in a location in which an electronic component or the like is provided. However, since placing the antenna coil 12 on the underside of the thermal diffusion sheet 20 such as a graphite sheet composed of a semiconductor causes magnetic flux from the external device 40 to be blocked by the thermal diffusion sheet 20, there is a case where communication performance sufficient to serve as an antenna cannot be ensured even by placing the antenna coil 12 on the outer edge side of the battery pack 15, which serves as the first conductor. That is, there is concern that the placement of the antenna coil 12 on the underside of the thermal diffusion sheet 20 may make it impossible to sufficiently enhance antenna communication characteristics based on a magnetic shield effect brought about by the battery pack 15.

Accordingly, in order to solve the foregoing problems, the antenna device 1 according to the present embodiment is characterized in that, as shown in FIGS. 2A and 2B, the thermal diffusion sheet 20 is provided with a slit 18 and a thermal diffusion sheet side opening 19.

The slit 18 is a long narrow cut that is greater in length than in width, and is formed so as to extend from a region overlapping the opening 12b of the antenna coil 12 to an end 20a of the thermal diffusion sheet 20. The slit 18 thus provided blocks a loop of eddy current flowing through the thermal diffusion sheet 20 at the time of communication, thus making it possible to prevent an eddy current from being generated and reduce a loss of magnetic flux that passes. It should be noted that since the slit 18 needs only to prevent the thermal diffusion sheet 20 from generating an eddy current, the width of the slit 18 is not limited to any particular width.

The thermal diffusion sheet side opening 19 is connected to the slit 18 and formed in the region overlapping the opening 12b of the antenna coil 12. This allows magnetic flux from the external device 40 to pass through the thermal diffusion sheet side opening 19 even in a case where the antenna coil 12 is placed on the underside of the thermal diffusion sheet 20, thus making it possible for the thermal diffusion sheet side opening 19 to communicate with the external device 40. This makes it possible to ensure satisfactory NFC antenna communication performance even in a case where the antenna coil 12 is placed on the underside of the thermal diffusion sheet 20.

Second Embodiment

Figure 3A:
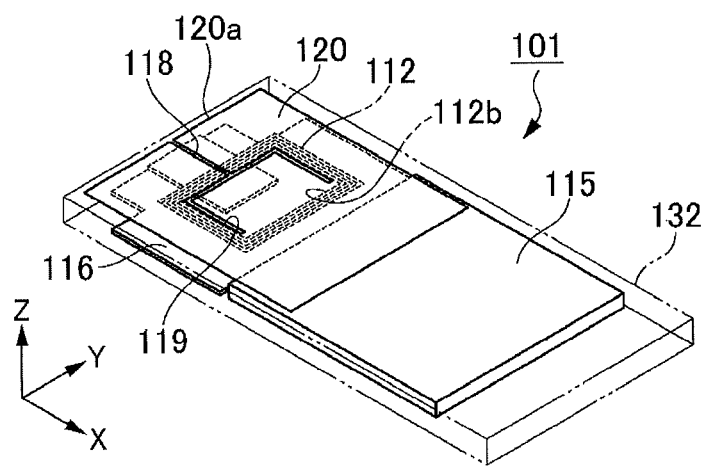
FIG. 3A is a perspective view schematically showing an example of a configuration of an antenna device according to another embodiment of the present invention.
Figure 3B:
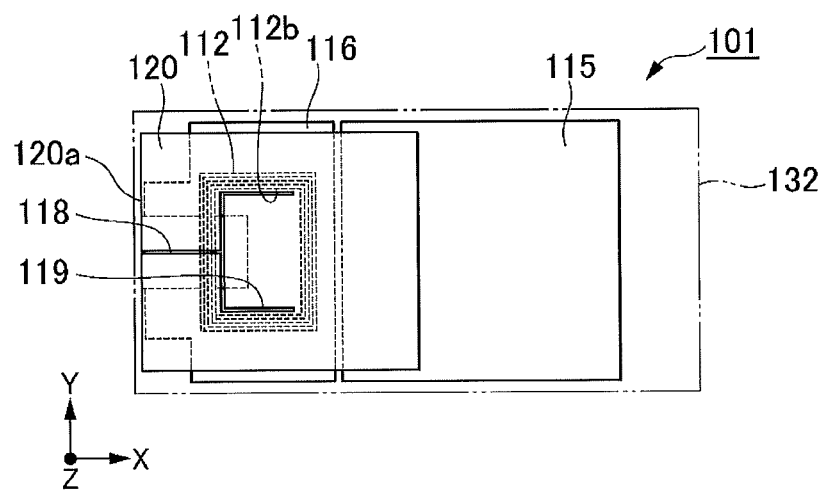
FIG. 3B is a plan view schematically showing an example of a configuration of an antenna device according to another embodiment of the present invention.

Next, a configuration of an antenna device according to another embodiment of the present invention is described with reference to the drawings. FIG. 3A is a perspective view schematically showing an example of a configuration of an antenna device according to another embodiment of the present invention. FIG. 3B is a plan view schematically showing an example of a configuration of an antenna device according to another embodiment of the present invention.

In order to solve the aforementioned problems, an antenna device 101 according to the present embodiment is characterized in that, as shown in FIGS. 3A and 3B, a thermal diffusion sheet 120 is provided with a slit 118 and a thermal diffusion sheet side slit 119.

The slit 118 is a long narrow cut that is greater in length than in width, and is formed so as to extend from a region overlapping an opening 112b of an antenna coil 112 to an end 120a of the thermal diffusion sheet 120. The slit 118 thus provided blocks a loop of eddy current flowing through the thermal diffusion sheet 120 at the time of communication, thus making it possible to prevent an eddy current from being generated and reduce a loss of magnetic flux that passes. It should be noted that since the slit 118 needs only to prevent the thermal diffusion sheet 120 from generating an eddy current, the width of the slit 118 is not limited to any particular width.

The antenna device 101 according to the present embodiment differs from the antenna device 1 according to the first embodiment in the shape of a vacant space connected to the slit 118 formed in the thermal diffusion sheet 120. That is, in the present embodiment, as shown in FIGS. 3A and 3D, the thermal diffusion sheet side slit 119, which is a long narrow cut that is greater in length than in width and which is formed so as to extend along the inner shape of the opening 112b of the antenna coil 112, is provided as the vacant space connected to the slit 118 formed in the thermal diffusion sheet 120.

The thermal diffusion sheet side slit 119 is formed so as to branch from a point of connection with the slit 118 and extend along three sides of the inner shape of the opening 112b of the rectangular antenna coil 112. The term "inner shape" here refers to a boundary division between the antenna coil 112 and the opening 112b of the antenna coil 112. Further, the width of the thermal diffusion sheet side slit 119 is not limited to any particular width, provided it is a width that makes communication with the external device 40 possible.

Such provision of the thermal diffusion sheet side slit 119, which is formed so as to extend along the inner shape of the opening 112b of the antenna coil 112, as the vacant space connected to the slit 118 formed in the thermal diffusion sheet 120 allows magnetic flux transmitted from the external device 40 (see FIG. 1) to pass through the thermal diffusion sheet side slit 119. This makes it possible to ensure satisfactory NFC antenna communication performance even in a case where the antenna coil 112 is placed on the underside of the thermal diffusion sheet 120. Further, the area of the vacant space connected to the slit 118 formed in the thermal diffusion sheet 120 is smaller than it is in the first embodiment. This makes it possible to inhibit a reduction in thermal diffusivity of the thermal diffusion sheet 120.

Third Embodiment

Figure 4A:
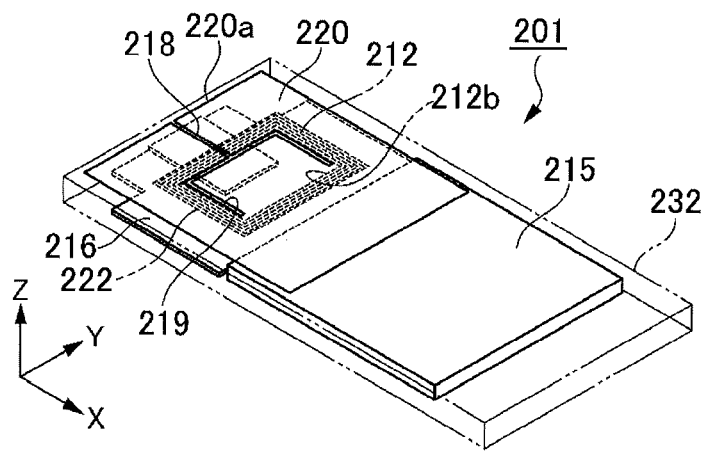
FIG. 4A is a perspective view schematically showing an example of a configuration of an antenna device according to another embodiment of the present invention.
Figure 4B:
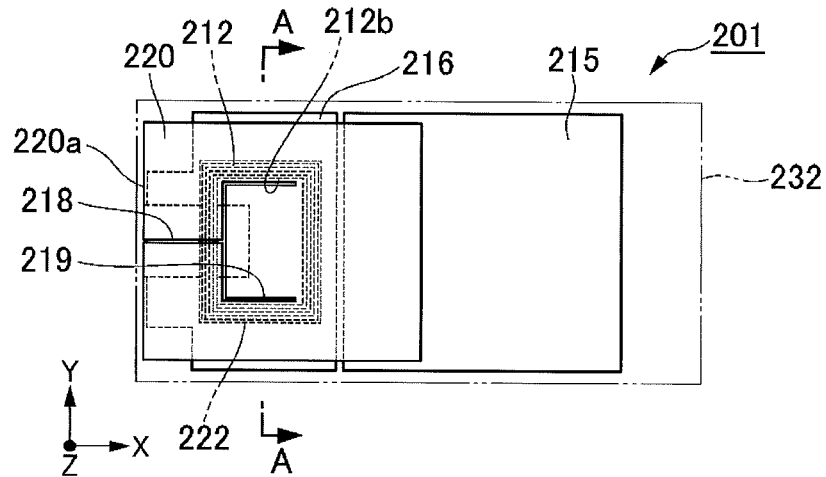
FIG. 4B is a plan view schematically showing an example of a configuration of an antenna device according to another embodiment of the present invention.
Figure 4C:
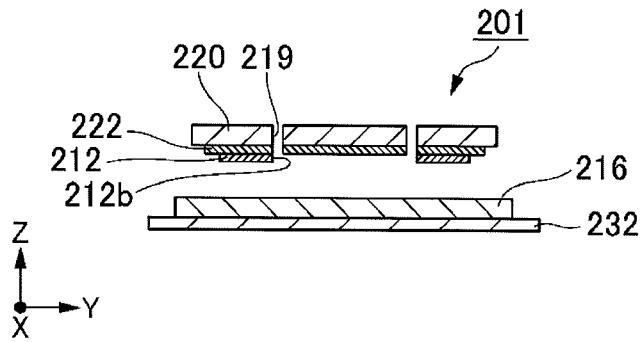
FIG. 4C is a cross-sectional view taken along line A-A in FIG. 4B.

Next, a configuration of an antenna device according to another embodiment of the present invention is described with reference to the drawings. FIG. 4A is a perspective view schematically showing an example of a configuration of an antenna device according to another embodiment of the present invention. FIG. 4B is a plan view schematically showing an example of a configuration of an antenna device according to another embodiment of the present invention. FIG. 4C is a cross-sectional view taken along line A-A in FIG. 4B.

In order to solve the aforementioned problems, an antenna device 201 according to the present embodiment is characterized in that, as shown in FIGS. 4A and 4B, a thermal diffusion sheet 220 is provided with a slit 218 and a thermal diffusion sheet side slit 219 and a metallic sheet 222 formed with at least parts of the slit 218 and the thermal diffusion sheet side slit 219 bored therethrough is further provided on one surface of the thermal diffusion sheet 220. In the present embodiment, as shown in FIG. 4C, the metallic sheet 222 formed with the slit 218 and the thermal diffusion sheet side slit 219 bored therethrough is provided between an antenna coil 212 and the thermal diffusion sheet 220.

The slit 218 is a long narrow cut that is greater in length than in width, and is formed so as to extend from a region overlapping an opening 212b of the antenna coil 212 to an end 220a of the thermal diffusion sheet 220. The slit 218 thus provided blocks a loop of eddy current flowing through the thermal diffusion sheet 220 at the time of communication, thus making it possible to prevent an eddy current from being generated and reduce a loss of magnetic flux that passes. It should be noted that since the slit 218 needs only to prevent the thermal diffusion sheet 220 from generating an eddy current, the width of the slit 218 is not limited to any particular width.

In comparison with the antenna device 101 according to the second embodiment, the antenna device 201 according to the present embodiment is characterized in further including, between the antenna coil 212 and the thermal diffusion sheet 220, the metallic sheet 222 composed of aluminum or the like formed with the slit 218 and the thermal diffusion sheet side slit 219 bored therethrough. In the present embodiment, as in the case of the antenna device 101 according to the second embodiment, as shown in FIGS. 4A and 4B, the thermal diffusion sheet side slit 219, which is a slit formed so as to extend along the inner shape of the opening 212b of the antenna coil 212, is provided as a vacant space connected to the slit 218 formed in the thermal diffusion sheet 220.

The thermal diffusion sheet side slit 219 is formed so as to branch from a point of connection with the slit 218 and extend along three sides of the inner shape of the opening 212b of the rectangular antenna coil 212. The term "inner shape" here refers to a boundary division between the antenna coil 212 and the opening 212b of the antenna coil 212.

The formation of the thermal diffusion sheet 220 by graphite, which is a semiconductor, prevents the smooth flow of an eddy current that is generated by the application of alternating magnetic flux from the external device 40. This may cause the eddy current to be lost as heat to lower the Q value of the antenna coil 212. For this reason, by further including, between the antenna coil 212 and the thermal diffusion sheet 220, the metallic sheet 222 formed with the slit 218 and the thermal diffusion sheet side slit 219 bored therethrough, the present embodiment prevents an electric current from flowing directly from the antenna coil 212 to the thermal diffusion sheet 220, thus inhibiting a lowering of the Q value of the antenna coil 212.

This makes it possible to ensure further satisfactory NFC antenna communication performance even in a case where the antenna coil 212 is placed on the underside of the thermal diffusion sheet 220. It should be noted that since an electric current flowing through the thermal diffusion sheet 220 composed of graphite constitutes a heat loss, it is preferable that the thermal diffusion sheet 220 be greater in slit width of the slit 218 and the thermal diffusion sheet side slit 219 than the metallic sheet 222.

It should be noted that although the present embodiment further includes, between the antenna coil 212 and the thermal diffusion sheet 220, the metallic sheet 222 formed with the slit 218 and the thermal diffusion sheet side slit 219 bored therethrough, the metallic sheet 222 according to the present embodiment has a function of inhibiting a lowering of the Q value of the antenna coil 212 in a case where a housing 232 of the electronic apparatus 30 (see FIG. 1) is made of metal. For this reason, the slit 218 and the thermal diffusion sheet side slit 219 may be provided in the metallic housing 232 had on a surface opposite to a surface of the thermal diffusion sheet 220 that faces the antenna coil 212.

Further, as in the case of the second embodiment, the provision of the thermal diffusion sheet side slit 219, which is formed so as to extend along the inner shape of the opening 212b of the antenna coil 212, as the vacant space connected to the slit 218 formed in the thermal diffusion sheet 220 allows magnetic flux transmitted from the external device 40 (see FIG. 1) to pass through the thermal diffusion sheet side slit 219. This makes it possible to ensure satisfactory NFC antenna communication performance even in a case where the antenna coil 212 is placed on the underside of the thermal diffusion sheet 220. Further, the area of the vacant space connected to the slit 218 formed in the thermal diffusion sheet 220 is smaller than it is in the first embodiment. This makes it possible to inhibit a reduction in thermal diffusivity of the thermal diffusion sheet 220.

It should be noted that the aspects of formation of the thermal diffusion sheet side slits 119 and 219, which are formed so as to extend along the inner shapes of the openings 112b and 212b of the antenna coils 112 and 212, as the vacant spaces that are connected to the slits 118 and 218 formed in the thermal diffusion sheets 120 and 220 according to the aforementioned other embodiments are not limited to the aforementioned aspects, respectively. Modifications of the thermal diffusion sheet side slits 119 and 219 are described below with reference to the drawings.

FIGS. 5A and 5B and FIGS. 6A to 6D are plan views schematically showing examples of configurations of antenna devices according to other embodiments of the present invention.

Figure 5A:
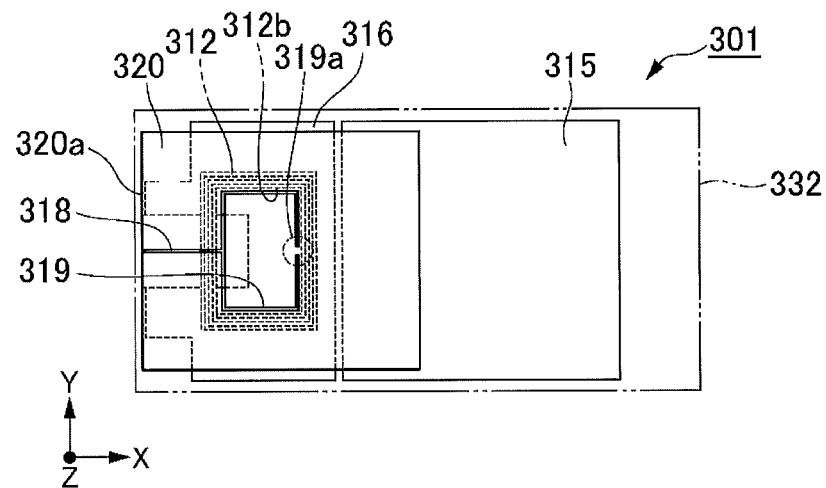
FIGS. 5A and 5B are plan views schematically showing examples of configurations of antenna devices according to other embodiments of the present invention.

As shown in FIG. 5A, an antenna device 301 according to another embodiment of the present invention is configured such that a thermal diffusion sheet side slit 319 connected to a slit 318 formed so as to extend from an end 320a of a thermal diffusion sheet 320 is formed so as to extend along four sides of the inner shape of an opening 312b of a rectangular antenna coil 312. That is, as shown in FIG. 5A, the thermal diffusion sheet side slit 319 is formed so as to extend along each side of the opening 312b of the rectangular antenna coil 312. It should be noted here that the four-sided slit poses a risk of separation of a part of the thermal diffusion sheet 320 that overlaps the opening 312b of the antenna coil 312, a slitless region 319a is provided in one side of the four-sided slit (i.e., in FIG. 5A, a side of the slit that faces a point of connection with the slit 318 formed so as to extend from a region overlapping the opening 312b of the antenna coil 312 to the end 320a of the thermal diffusion sheet 320).

Figure 5B:
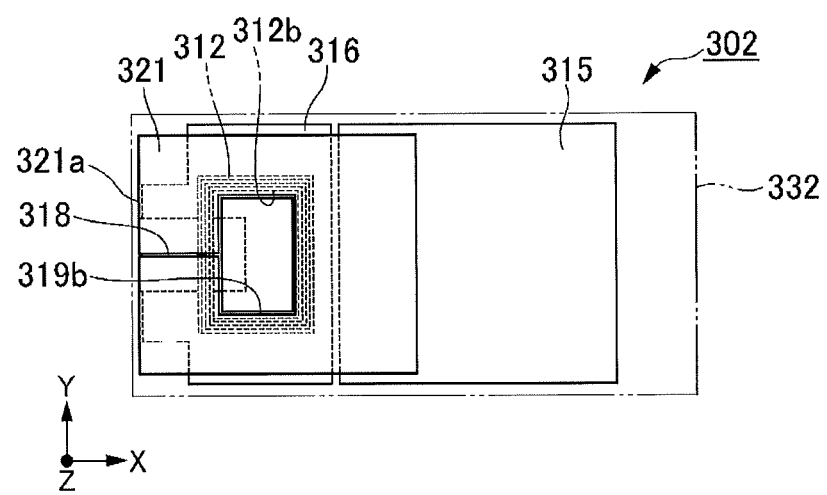

However, as in the case of an antenna device 302 shown in FIG. 5B where a thermal diffusion sheet 321 is coated with resin or the like, a thermal diffusion sheet side slit 319b may be slit in all of the four sides of the antenna coil 312, as there is no risk of separation of the thermal diffusion sheet 321 inside the antenna coil 312. Such formation of the thermal diffusion sheet side slit 319b, which is connected to the slit 318 formed so as to extend from the end 321a of the thermal diffusion sheet 321, along the inner shape of the opening 312a of the substantially rectangular antenna coil 312 allows magnetic flux to pass through the thermal diffusion sheet side slit 319b. This makes it possible to ensure satisfactory NFC antenna communication performance even in a case where the antenna coil 312 is placed on the underside of the thermal diffusion sheet 321.

Figure 6A:
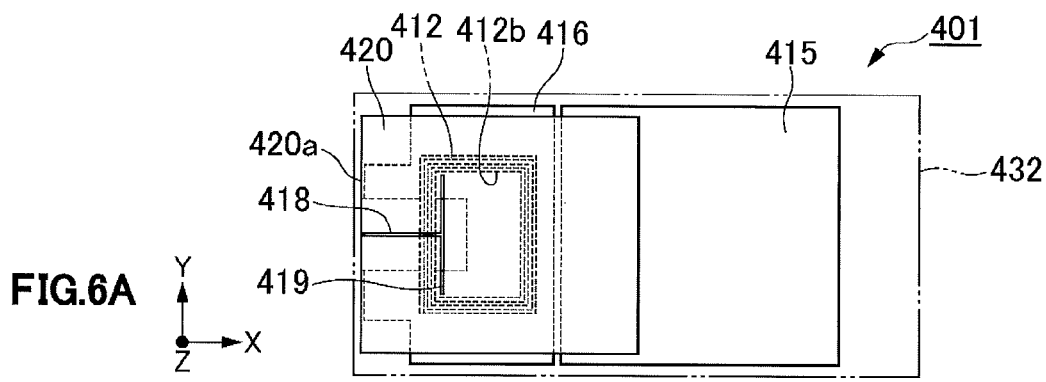
FIGS. 6A to 6D are plan views schematically showing examples of configurations of antenna devices according to other embodiments of the present invention.
Figure 6B:
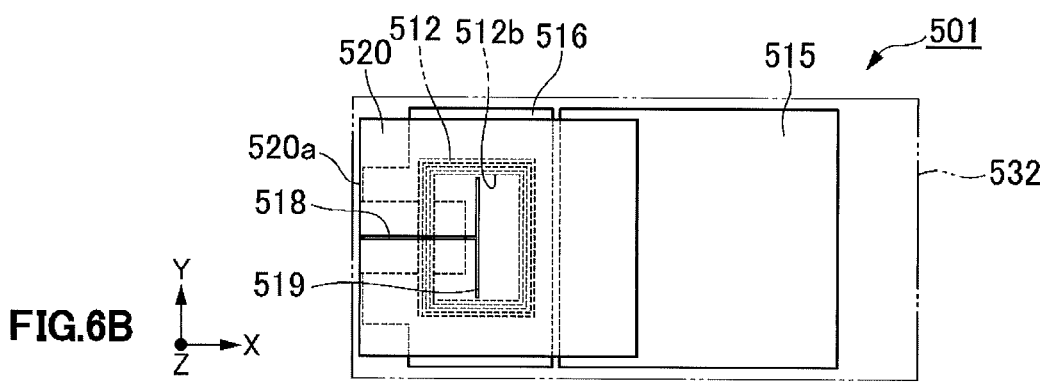
Figure 6C:
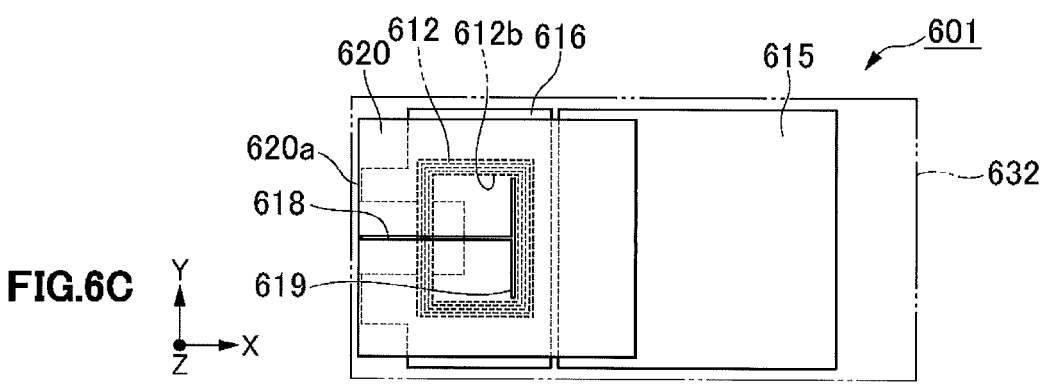
Figure 6D:
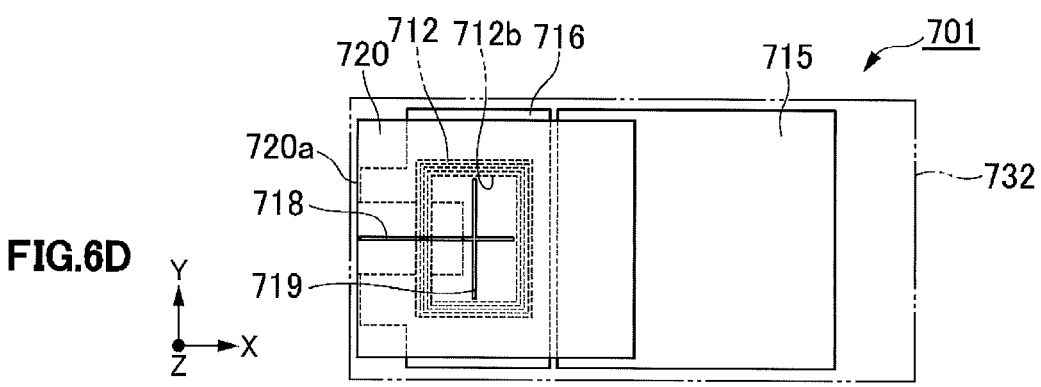

Further, an antenna device 401 shown in FIG. 6A is configured such that a diffusion sheet side slit 419 connected to a slit 418 formed so as to extend from an end 420a of a thermal diffusion sheet 420 is formed so as to extend along the inner shape of the upper side of an antenna coil 412. Meanwhile, an antenna device 501 shown in FIG. 6B is configured such that a thermal diffusion sheet side slit 519 connected to a slit 518 formed so as to extend from an end 520a of a thermal diffusion sheet 520 traverses longitudinally an intermediate region of an opening 512b of an antenna coil 512. Further, an antenna device 601 shown in FIG. 6C is configured such that a thermal diffusion sheet side slit 619 connected to a slit 618 formed so as to extend from an end 620a of a thermal diffusion sheet 620 is formed so as to extend along the inner shape of the lower side of an antenna coil 612. Furthermore, an antenna device 701 shown in FIG. 6D is configured such that a thermal diffusion sheet side slit 719 connected to a slit 718 formed so as to extend from an end 720a of a thermal diffusion sheet 720 is formed in the shape of a cross that transverses longitudinally the length and breadth of an intermediate region of an opening 712b of an antenna coil 712.

Such formation of the thermal diffusion sheet side slits in the regions overlapping the openings 412b, 512b, 612b, and 712b of the antenna coils 412, 512, 612, and 712 allows magnetic flux to pass through the thermal diffusion sheet side slits, respectively. That is, even when the thermal diffusion sheet side slits 419, 519, 619, and 719 connected to the slits 418, 518, 618, and 718 are not formed so as to extend along the inner shapes of the openings 412b, 512b, 612b, and 712b of the substantially rectangular antenna coils 412, 512, 612, and 712, the formation of the thermal diffusion sheet side slits in the regions overlapping the openings 412b, 512b, 612b, and 712b of the antenna coils 412, 512, 612, and 712 allows magnetic flux to pass through the thermal diffusion sheet side slits, respectively.

This makes it possible to ensure satisfactory NFC antenna communication performance even in a case where the antenna coils 412, 512, 612, and 712 are placed on the undersides of the thermal diffusion sheets 420, 520, 620, and 720, respectively. Further, since the position of passage of magnetic flux varies according to the positions of formation of the diffusion sheet side slits 419, 519, 619, and 719, the positions of formation of the diffusion sheet side slits 419, 519, 619, and 719 can be adjusted, for example, according to the position of communication with the external device 40, respectively.

It should be noted that although each of the antenna devices according to the aforementioned embodiments is configured such that the shape of the antenna coil is a rectangle, the shape of the antenna coil is not limited to a rectangle, but a polygonal antenna coil such as a hexagonal or octagonal antenna coil or a curved antenna coil such as a circular or elliptical antenna coil may be applied. That is, an antenna coil provided by winding a conducting wire in a two-dimensional shape may be applied to each of the antenna devices according to the embodiments of the present invention, as such an antenna coil functions as an antenna coil that is inductively coupled to an external device.

Thus, each of the antenna devices according to the embodiments of the present invention is configured such that the provision of the thermal diffusion sheet side opening or slit in the region of the thermal diffusion sheet overlapping the opening of the antenna coil allows magnetic flux to pass through the thermal diffusion sheet side opening or slit. This makes it possible to ensure satisfactory NFC antenna communication performance even in a case where the antenna coil is placed on the underside of the thermal diffusion sheet. Further, attaching such an antenna device to an electronic apparatus that is able to communicate with an external device via an electromagnetic field signal makes it possible to ensure satisfactory antenna communication characteristics of the electronic apparatus with respect to the external device while improving the degree of freedom of design of the antenna device.

EXAMPLES

Next, examples of examination and evaluation of antenna devices according to embodiments of the present invention are described with reference to the drawings. The action and effects of the antenna devices according to the embodiments of the present invention were verified with reference to the following Examples 1 to 3 and Comparative Examples 1 to 3. It should be noted that the present invention is not limited to these examples.

Figure 7A:
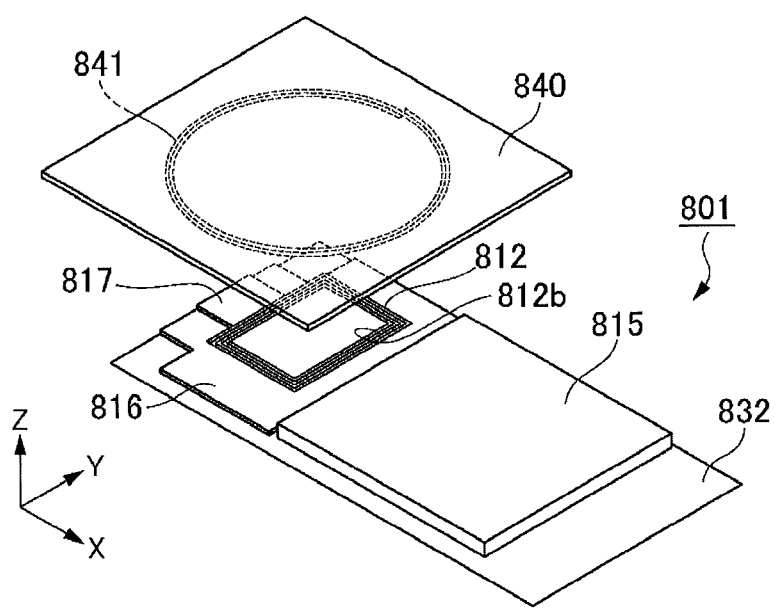
FIGS. 7A to 7C are explanatory diagrams of an evaluation method for checking the action and effects of an antenna device according to an embodiment of the present invention.
Figure 7B:
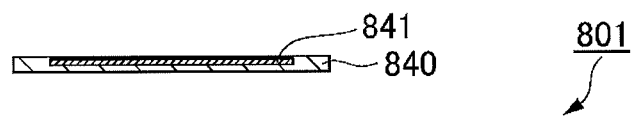
Figure 7C:
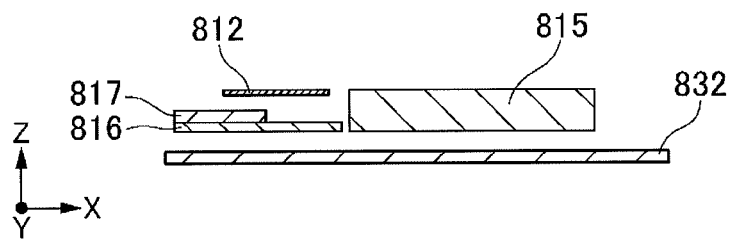
Figure 7C:
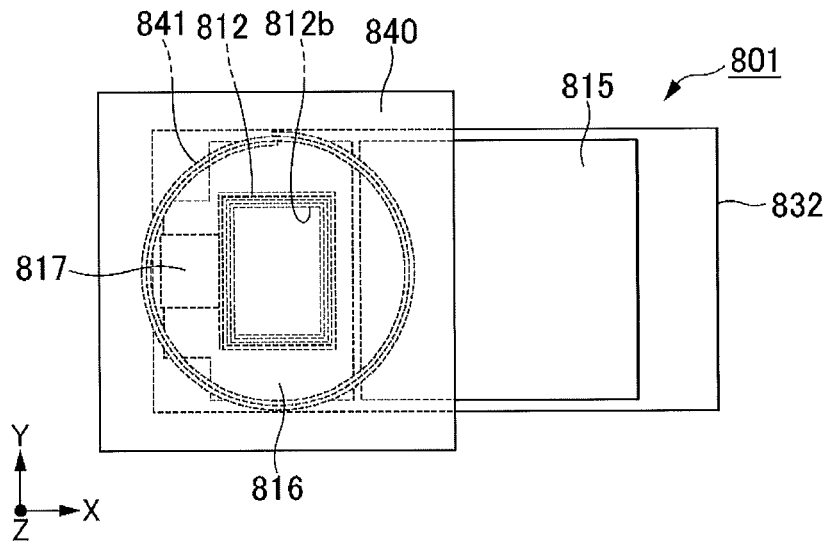
Figure 8A:
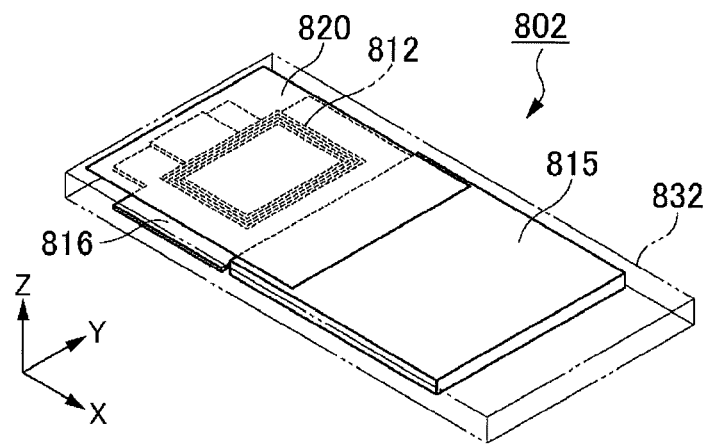
FIG. 8A is a perspective view schematically showing an example of a configuration of an antenna device serving as a comparative example.
Figure 8B:
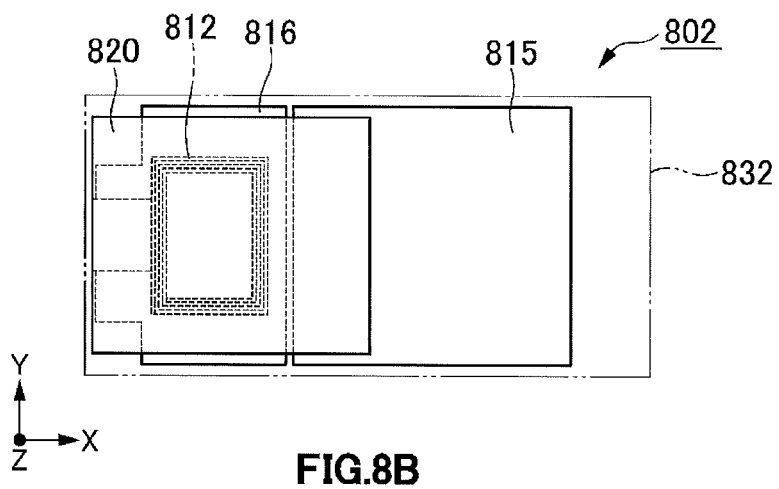
FIG. 8B is a plan view schematically showing an example of a configuration of an antenna device serving as a comparative example.

First, the basic examination and evaluation of the shape and the like of a vacant space that is provided in a thermal diffusion sheet in creating an antenna device according to an embodiment of the present invention is described with reference to the drawings. FIGS. 7A to 7C are explanatory diagrams of an evaluation method for checking the action and effects of an antenna device according to an embodiment of the present invention. FIG. 7A is a perspective view of Comparative Example 1 representing an antenna device 801 without a graphite sheet. FIG. 7B is a cross-sectional view of Comparative Example 1. FIG. 7C is a plan view of Comparative Example 1. Further, FIGS. 8A and 8B are a perspective view and a plan view, respectively, schematically showing an example of a configuration of an antenna device 802 serving as Comparative Example 2. Furthermore, FIGS. 9A and 9B are a perspective view and a plan view, respectively, schematically showing an example of a configuration of an antenna device 803 serving as Comparative Example 3, and FIG. 9C is a cross-sectional view taken along line B-B in FIG. 9B.

An evaluation test was carried out on the antenna device 801 of Comparative Example 1 shown in FIGS. 7A to 7C. The antenna device 801 included an antenna coil 812 measuring 40 mm×30 mm×0.3 mm, a battery pack 815 measuring 70 mm×64 mm×4 mm, a printed circuit board 816, a SIM slot 817, and a housing substrate 832 measuring 140 mm×70 mm, with the battery pack 815 provided on the housing substrate 832, with the antenna coil 812 and the SIM slot 817 provided on the printed circuit board 816, and with no graphite sheet on the upper side of the antenna coil 812. Moreover, a distribution of coefficients of magnetic coupling was evaluated by placing a reader antenna 840 including an antenna coil 841 of two turns 70 mm in diameter directly above the antenna coil 812 at a distance of 45 mm and moving the reader antenna 840 in X-axis directions with the point of origin being the position of coincidence of the centers of the two antennas.

Further, an evaluation test was carried out on the antenna device 802 of Comparative Example 2 shown in FIGS. 8A and 8B. The antenna device 802 included an antenna coil 812 measuring 40 mm×30 mm×0.3 mm, a battery pack 815 measuring 70 mm×64 mm×4 mm, a printed circuit board 816, a SIM slot 817, a graphite sheet 820 0.06 mm thick without an opening, and a housing substrate 832 measuring 140 mm×70 mm, with the battery pack 815 provided on the housing substrate 832, with the antenna coil 812 and the SIM slot 817 provided on the printed circuit board 816, and with the graphite sheet 820 disposed on the upper side of the antenna coil 812. Moreover, a distribution of coefficients of magnetic coupling was similarly evaluated by moving the reader antenna 840 in X-axis directions.

Figure 9A:
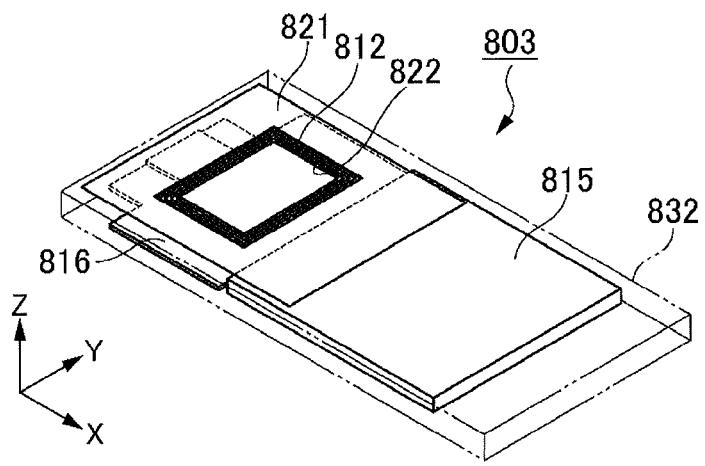
FIG. 9A is a perspective view schematically showing an example of a configuration of an antenna device serving as another comparative example.
Figure 9B:
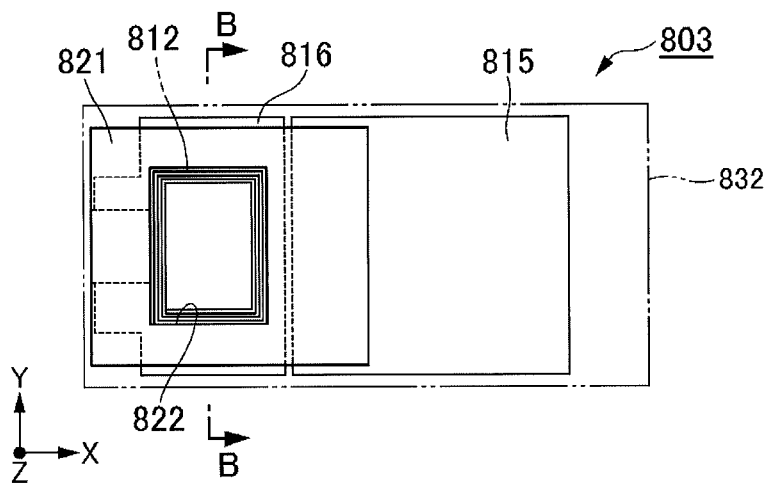
FIG. 9B is a plan view schematically showing an example of a configuration of an antenna device serving as another comparative example.
Figure 9C:
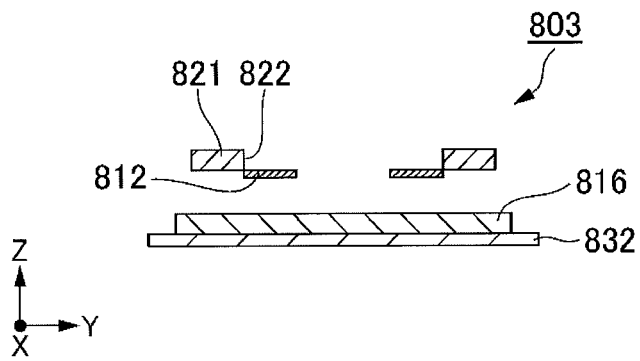
FIG. 9C is a cross-sectional view taken along line B-B in FIG. 9B.

Furthermore, an evaluation test was carried out on the antenna device 803 of Comparative Example 3 shown in FIGS. 9A to 9C. The antenna device 803 included an antenna coil 812 measuring 40 mm×30 mm×0.3 mm, a battery pack 815 measuring 70 mm×64 mm×4 mm, a printed circuit board 816, a SIM slot 817, a graphite sheet 821 0.06 mm thick provided with an opening 822 of the same size as the outer shape of the antenna coil 812, and a housing substrate 832 measuring 140 mm×70 mm, with the battery pack 815 provided on the housing substrate 832, with the antenna coil 812 and the SIM slot 817 provided on the printed circuit board 816, and with the graphite sheet 821 disposed on the upper side of the antenna coil 812. Moreover, a distribution of coefficients of magnetic coupling was similarly evaluated by moving the reader antenna 840 in X-axis directions.

Further, an evaluation test was carried out on the antenna device 1 according to the first embodiment of the present invention as Example 1 so that a distribution of coefficients of magnetic coupling was similarly evaluated by moving the reader antenna 840 in X-axis directions. The antenna device 1 of Example 1 included an antenna coil 12 measuring 40 mm×30 mm×0.3 mm with an antenna opening 12b, a battery pack 15 measuring 70 mm×64 mm×4 mm, a printed circuit board 16, a SIM slot 17, and a graphite sheet 20 0.06 mm thick with an opening 19 measuring 10 mm per side formed on the center side of the antenna opening 12b and connected to an end 20a of the graphite sheet 20 by a slit 18 measuring 0.5 mm, and a housing substrate 32 measuring 140 mm×70 mm, with the battery pack 15 provided on the housing substrate 32, with the antenna coil 12 and the SIM slot 17 provided on the printed circuit board 16, and with the graphite sheet 20 disposed on the upper side of the antenna coil 12.

Furthermore, an evaluation test was carried out on the antenna device 101 according to the second embodiment of the present invention as Example 2 so that a distribution of coefficients of magnetic coupling was similarly evaluated by moving the reader antenna 840 in X-axis directions. The antenna device 101 of Example 2 included an antenna coil 112 measuring 40 mm×30 mm×0.3 mm with an opening 112b, a battery pack 115 measuring 70 mm×64 mm×4 mm, a printed circuit board 116, a SIM slot 117, and a graphite sheet 120 0.06 mm thick with a thermal diffusion sheet side slit 119 0.5 mm wide formed so as to extend along the inner shape of the opening 112b of the antenna coil 112 and connected to an end 120a of the graphite sheet 120 by a slit 118 measuring 0.5 mm, and a housing substrate 132 measuring 140 mm×70 mm, with the battery pack 115 provided on the housing substrate 132, with the antenna coil 112 and the SIM slot 117 provided on the printed circuit board 116, and with the graphite sheet 120 disposed on the upper side of the antenna coil 112.

Further, an evaluation test was carried out on the antenna device 201 according to the third embodiment of the present invention as Example 3 so that a distribution of coefficients of magnetic coupling was similarly evaluated by moving the reader antenna 840 in X-axis directions. The antenna device 201 of Example 3 included an antenna coil 212 measuring 40 mm×30 mm×0.3 mm with an opening 212b, a battery pack 215 measuring 70 mm×64 mm×4 mm, a printed circuit board 216, a SIM slot 217, and a graphite sheet 220 0.06 mm thick with a thermal diffusion sheet side slit 219 0.5 mm wide formed so as to extend along the inner shape of the opening 212b of the antenna coil 212 and connected to an end 220a of the graphite sheet 220 by a slit 218 measuring 0.5 mm, a metallic sheet 222 made of 50-μ aluminum foil of the same size and slit in the same manner as the graphite sheet 220, and a housing substrate 232 measuring 140 mm×70 mm, with the battery pack 215 provided on the housing substrate 232, with the antenna coil 212 and the SIM slot 217 provided on the printed circuit board 216, with the graphite sheet 220 disposed on the upper side of the antenna coil 212, and with the metallic sheet 222 joined on the underside (NFC antenna side) of the graphite sheet 220.

Figure 10:
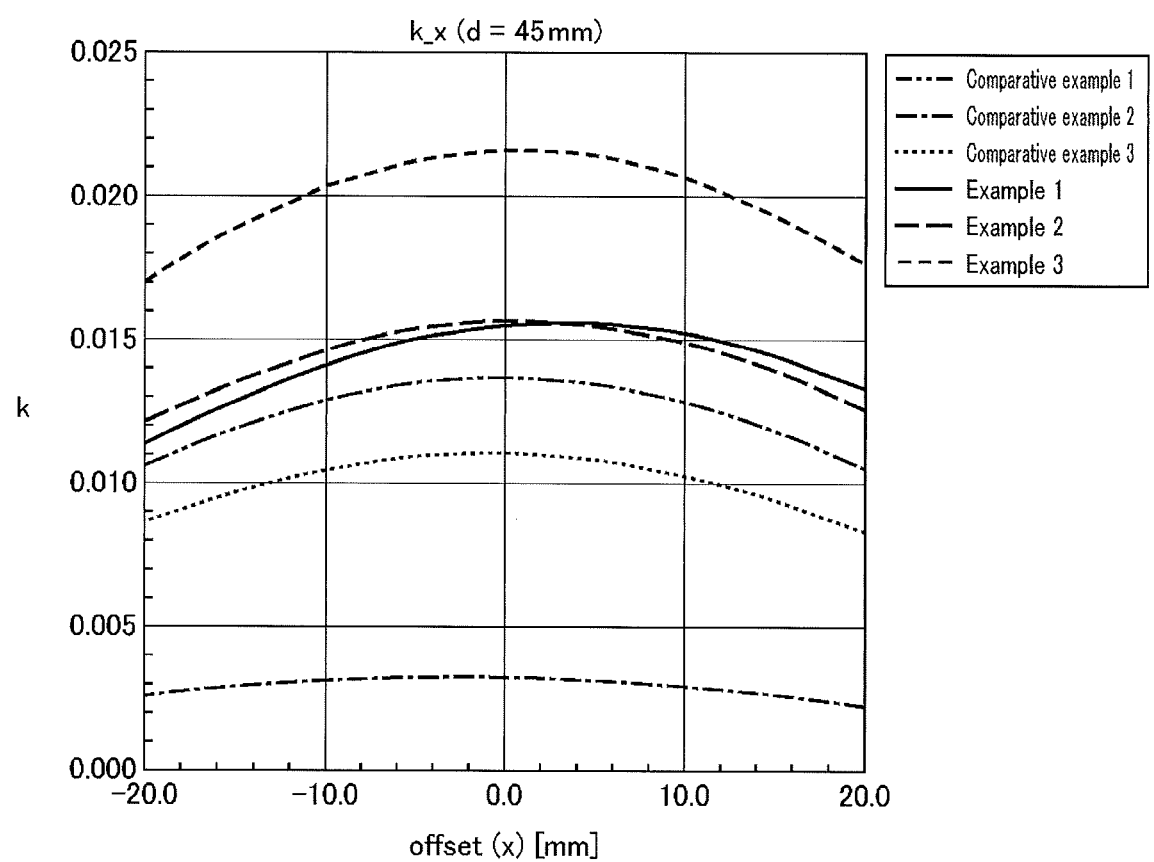
FIG. 10 is a graph showing a result of evaluation of communication performance for checking the action and effects of an antenna device according to an embodiment of the present invention.

FIG. 10 is a graph showing a result of evaluation of communication performance for checking the action and effects of an antenna device according to an embodiment of the present invention. In Comparative Example 1, which serves as a benchmark, the coefficient of coupling k ranges between 0.010 and 0.014. On the other hand, in Comparative Example 2, the coefficient of coupling k is significantly reduced to range between 0.002 and 0.003, as the coverage of the whole surface of the antenna coil 812 by the graphite sheet 820 causes much of the magnetic flux from the reader antenna 840 to be blocked. Meanwhile, in Comparative Example 3, the coefficient of coupling k ranges between 0.008 and 0.011, which means poorer communication characteristics than those of Comparative Example 1, as the graphite sheet 821 is provided with the opening 822 but is not provided with a slit that is used for connecting the opening 822 to an end of the graphite sheet 821.

On the other hand, in Example 1, the coefficient of coupling k ranges between 0.011 and 0.016, which are more satisfactory values than those of Comparative Example 1, which serves as a benchmark. This shows that providing the graphite sheet 20 with the slit 18 and the thermal diffusion sheet side opening 19 both prevents the thermal diffusion sheet 20 from generating an eddy current and allows magnetic flux from the reader antenna 840 to pass through the opening 12b of the antenna coil 12, thus making it possible to achieve satisfactory communication characteristics.

Further, in Example 2, as in Example 1, the coefficient of coupling k ranges between 0.011 and 0.016, which are more satisfactory values than those of Comparative Example 1, which serves as a benchmark. This shows that providing the graphite sheet 120 with the slit 118 and the thermal diffusion sheet side slit 119 both prevents the thermal diffusion sheet 120 from generating an eddy current and allows magnetic flux from the reader antenna 840 to pass through the opening 112b of the antenna coil 112, thus making it possible to achieve satisfactory communication characteristics as in Example 1.

Furthermore, in Example 3, the coefficient of coupling k ranges between 0.017 and 0.022, which are more satisfactory values than those of Examples 1 and 2. This shows that providing the graphite sheet 220 with the slit 218 and the thermal diffusion sheet side slit 219 and joining, on the underside of the graphite sheet 220, the metallic sheet 222 made of the same size and slit in the same manner as the graphite sheet 220 brings about significant improvement in communication characteristics. This is shown to prevent the thermal diffusion sheet 220 from generating an eddy current, allow magnetic flux from the reader antenna 840 to pass through the opening 212b of the antenna coil 212, and inhibit a lowering of the Q value of the antenna coil 212, thus bringing about significant improvement in communication characteristics.

While embodiments and examples of the present invention have been described in detail above, it is easily understood by persons skilled in the art that many modifications are possible without substantially departing from the new matters and effects of the present invention. Therefore, all such modifications are encompassed in the scope of the present invention.

For example, a term used at least once in the description or drawings together with a different term that is broader or the same in meaning can also be replaced by the different term in any place in the description or drawings. Further, the configurations and operations of an antenna device and an electronic apparatus are not limited to those described in embodiments and examples of the present invention but may be carried out in various modifications.

GLOSSARY OF DRAWING REFERENCES 1, 101, 201, 301, 401, 501, 601, 701 Antenna device
2 Antenna module
3 Antenna Substrate
12, 112, 212, 312, 412, 512, 612, 712 Antenna coil
12a Conducting wire
12b, 112b, 212b, 312b, 412b, 512b, 612b, 712b Opening
13 Communication processing unit
14 Terminal area
15 Battery pack
16 Printed circuit board
17 SIM slot
18, 118, 218, 318, 418, 518, 618, 718 Slit
19 Thermal diffusion sheet side opening
20, 120, 220, 320, 420, 520, 620, 720 Thermal diffusion sheet
30 Electronic apparatus
32 Housing
40 Reader/writer (external device)
41 Antenna
42 Control Board
43 Control circuit
119, 219, 319, 419, 519, 619, 719 Thermal diffusion sheet side slit
222 Metal sheet

The invention claimed is:

1. An antenna device, incorporated in an electronic apparatus, which communicates with an external device via an electromagnetic field signal, comprising:
   an antenna coil provided by winding a conducting wire in a two-dimensional shape and inductively coupled to the external device;
   a thermal diffusion sheet provided so as to overlap the antenna coil at a surface of the antenna coil that faces the external device, wherein:
   the thermal diffusion sheet is provided with:
      a slit formed so as to extend from a region overlapping an opening of the antenna coil to an end of the thermal diffusion sheet; and
      a thermal diffusion sheet side slit connected to the slit and formed in the region overlapping the opening of the antenna coil,
   the opening of the antenna coil has a rectangular shape, and
   the thermal diffusion sheet side slit is formed along at least two sides of inner shape of the antenna coil; and
   on one surface of the thermal diffusion sheet, a metallic sheet formed with at least parts of the slit and the thermal diffusion sheet side slit bored therethrough.

2. The antenna device according to claim 1, wherein the thermal diffusion sheet side slit is formed along three sides of the inner shape of the antenna coil.

3. The antenna device according to claim 2, wherein the thermal diffusion sheet is formed from graphite.

4. The antenna device according to claim 1, wherein the thermal diffusion sheet side slit is formed along three sides of the inner shape of the antenna coil.

5. The antenna device according to claim 4, wherein the thermal diffusion sheet is formed from graphite.

6. The antenna device according to claim 1, wherein the thermal diffusion sheet side slit is formed along four sides of the inner shape of the antenna coil.

7. The antenna device according to claim 6, wherein the thermal diffusion sheet is formed from graphite.

8. The antenna device according to claim 6, wherein among the thermal diffusion sheet side slit of four sides, in one of the four sides, a slitless region is provided.

9. The antenna device according to claim 1, wherein the thermal diffusion sheet side slit is formed along four sides of the inner shape of the antenna coil.

10. The antenna device according to claim 9, wherein the thermal diffusion sheet is formed from graphite.

11. The antenna device according to claim 9, wherein among the thermal diffusion sheet side slit of four sides, in one of the four sides, a slitless region is provided.

12. The antenna device according to claim 1, wherein the thermal diffusion sheet is formed from graphite.

13. The antenna device according to claim4 1, wherein the thermal diffusion sheet is formed from graphite.

14. An electronic apparatus that is able to communicate with an external device via an electromagnetic field signal, comprising the antenna device according to claim 1.

* * * * *